United States Patent [19]

Sanderson et al.

[11] Patent Number: 4,497,947

[45] Date of Patent: Feb. 5, 1985

[54] POLYCARBONATE COMPOSITIONS HAVING IMPROVED HEAT DEFLECTION TEMPERATURE

[75] Inventors: John R. Sanderson, Austin, Tex.; Sivaram Krishnan, Pittsburgh, Pa.

[73] Assignee: Mobay Chemical Corporation, Pittsburgh, Pa.

[21] Appl. No.: 557,990

[22] Filed: Dec. 5, 1983

Related U.S. Application Data

[63] Continuation of Ser. No. 385,132, Jun. 3, 1982, abandoned.

[51] Int. Cl.³ .............................................. C08G 63/62
[52] U.S. Cl. .................................... 528/174; 528/128; 528/171
[58] Field of Search ......................... 528/128, 174, 171

[56] References Cited

U.S. PATENT DOCUMENTS

| | | | |
|---|---|---|---|
| 2,999,846 | 9/1961 | Schnell et al. | 528/174 |
| 3,023,101 | 2/1962 | Ossenbrunner et al. | 96/87 |
| 3,065,274 | 11/1962 | Vegter et al. | 260/607 |
| 3,271,367 | 9/1966 | Schnell et al. | 528/174 |
| 3,551,501 | 12/1970 | Clark | 260/607 |
| 3,737,409 | 6/1973 | Fox | 528/174 |
| 3,748,303 | 7/1973 | Becker et al. | 260/47 X A |
| 3,876,580 | 4/1975 | Nouvertne et al. | 528/174 |
| 3,879,347 | 4/1975 | Serini et al. | 528/174 |
| 3,912,688 | 10/1975 | Schiller et al. | 528/174 |
| 4,009,148 | 2/1977 | Neuray et al. | 528/174 |
| 4,043,980 | 8/1977 | Baron et al. | 528/174 |
| 4,055,544 | 10/1977 | Baggett | 528/174 |
| 4,294,954 | 10/1981 | Orlando et al. | 528/174 |
| 4,306,055 | 12/1981 | Baron et al. | 528/174 |

FOREIGN PATENT DOCUMENTS

| | | |
|---|---|---|
| 2119779 | 11/1972 | Fed. Rep. of Germany . |
| 857430 | 12/1960 | United Kingdom . |
| 1045533 | 10/1966 | United Kingdom . |

*Primary Examiner*—Lester L. Lee
*Attorney, Agent, or Firm*—Gene Harsh; Lawrence S. Pope; Aron Preis

[57] ABSTRACT

The present invention is directed to an aromatic copolycarbonate molding composition comprising the reaction product of an aromatic diphenol, an aromatic sulfonyl diphenol, a dihydroxybiphenyl and a carbonic acid derivative, said composition being characterized by its improved heat deflection temperature and critical thickness.

6 Claims, No Drawings

POLYCARBONATE COMPOSITIONS HAVING IMPROVED HEAT DEFLECTION TEMPERATURE

This application is a continuation, of application Ser. No. 385,132 filed June 3, 1982 and now abandoned.

FIELD OF THE INVENTION

This invention relates to polycarbonate polymers and, more particularly, to polycarbonate copolymers having improved heat deflection temperatures and good physical properties.

BACKGROUND OF THE INVENTION

Polycarbonates derived from reactions involving organic dihydroxy compounds and carbonic acid derivatives have found extensive commercial application because of their excellent mechanical and physical properties. These thermoplastic polymers are particularly suited for the manufacture of molded articles where impact strength, rigidity, toughness, thermal and dimensional stability as well as excellent electrical properties are required.

However, one deficiency of polycarbonate when used in molded articles is the heat deflection temperature of the polycarbonate polymer. As determined by ASTM D-648/72, the heat deflection temperature defines the temperature at which a 0.25 mm deflection occurs when a specimen 127 mm in length, 13 mm in depth and 3 mm to 13 mm in width are subjected to a load applied at its center to give maximum fiber stresses of 66 psi (455 kPa) or 264 psi (1820 kPa). Typical polycarbonates known in the prior art exhibit heat deflection temperatures of from about 135° to 141° C. at a 264 psi load.

In accordance with the present invention, a copolycarbonate is provided with improved heat deflection temperature and good physical properties.

The copolycarbonate of the invention comprises the reaction product of an aromatic diphenol, an aromatic, sulfonyl diphenol, a dihydroxybiphenyl and a carbonic acid derivative such as phosgene or carbonyl bromide.

Copolycarbonates and terpolycarbonates based on aromatic sulfonyl diphenols are known in the art (see U.S. Pat. Nos. 3,023,101, 3,271,367 and 3,912,688) as are copolycarbonates based on biphenyls (U.S. Pat. No. 3,748,303). Also of interest as background information are U.S. Pat. Nos. 3,065,274 and 3,551,501.

SUMMARY OF THE INVENTION

The present invention is directed to molding compositions comprising the polycondensation reaction product of a carbonic acid derivative with an aromatic diphenol, an aromatic sulfonyl diphenol and a dihydroxybiphenyl which reaction product is characterized by its improved heat deflection temperature and critical thickness.

DETAILED DESCRIPTION OF THE INVENTION

When used herein, the term "copolycarbonate resin" means the neat resin without additives, and the term "copolycarbonate" means the copolycarbonate resin with additives therein.

The copolycarbonate resins of the invention may be prepared by conventional methods of preparation for polycarbonate resins and may have a weight average molecular weight of 10,000 to 200,000 and preferably have a melt flow rate of about 1 to 24 gm/10 min., most preferably about 2-6 gm/10 min., at 300° C. according to ASTM D-1238.

Any suitable process, reactant, catalyst, solvent, reaction conditions and the like for the production of the copolycarbonate resins which are customarily employed in polycarbonate resin synthesis may be used, such as are disclosed in German Pat. Nos. 926,274 and 1,046,311 and U.S. Pat. Nos. 2,964,794; 2,970,131; 2,991,273; 2,999,846; 2,999,835; 3,028,365; 3,153,008; 3,187,065; 3,215,668; 3,248,414 and 3,912,688, all incorporated herein by reference. The preferred process is the interfacial polycondensation process.

According to the interfacial polycondensation process, copolycarbonate resins are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide, or bis-chloroformic esters of the aromatic dihydroxy compounds. An organic solvent is provided in the reaction admixture which is a solvent for the polymer but not for the aromatic dihydroxy salts. Thus, chlorinated and non-chlorinated aliphatic hydrocarbons or chlorinated and non-chlorinated aromatic hydrocarbons are used as the organic solvent which dissolves the condensation product. Suitable solvents include cyclohexane, methylcyclohexane, benzene, toluene, xylene, methylene chloride, chloroform, carbon tetrachloride and chlorobenzene.

In order to limit the molecular weight, one may use monofunctional reactants such as monophenols, for example, the propyl-, isopropyl- and butylphenols, especially p-tert-butylphenol and phenol itself. In order to accelerate the reaction, catalysts such as tertiary amines, quaternary ammonium, phosphonium or arsonium salts and the like may be used. The reaction temperature should be about −20° C. to +150° C., preferably 0° C. to about 100° C.

According to the polycondensation process in a homogeneous phase, the dissolved reaction components art polycondensed in an inert solvent in the presence of an equivalent amount of a tertiary amine base required for absorption of the generated HCl such as, e.g., N,N-dimethyl-aniline, N,N-dimethyl-cyclohexylamine or preferably pyridine and the like.

In still another process, a diaryl carbonate can be transesterified with the aromatic dihydroxy compounds to form the polycarbonate resin.

It is to be understood that it is possible to combine in a chemically meaningful way in the processes described above both the aromatic dihydroxy compounds and the monohydroxy compounds in the form of alkali metal salts and/or bis-haloformic acid esters, and the amount of phosgene or carbonyl bromide then still required in order to obtain high molecular weight products. Other methods of synthesis in forming the polycarbonates of the invention such as disclosed in U.S. Pat. No. 3,912,688, incorporated herein by reference, may also be used.

The aromatic diphenols useful in the present context conform to the structural formulae (1) or (2)

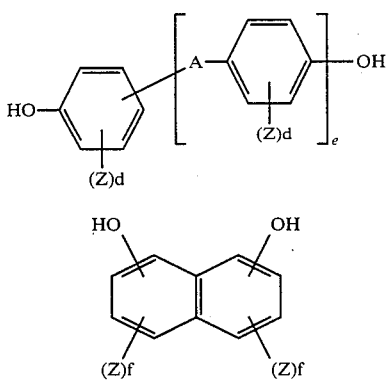

(1)

(2)

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, an —SO— or a radical of the general formula

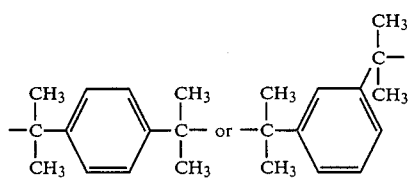

e denotes the number 0 or 1;
Z denotes F, Cl, Br or a $C_1$–$C_2$ alkyl and if several Z radicals are substituents in one aryl radical, they may be identical or different;
d denotes 0 or an integer of from 1 to 4; and
f denotes 0 or an integer from 1 to 3.

Among the useful bisphenols in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides and α,α-bis-(hydroxyphenyl)-diisopropylbenzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) Nos. 1,470,703; 2,063,050; 2,063,052; 2,211,956 and 2,211,957, in French patent specification No. 1,561,518 and in the monograph, H. Schnell, *Chemistry and Physics of Polycarbonates,* Interscience Publishers, New York, 1964. Further examples of suitable bisphenols are 2,2-bis-(4-hydroxyphenyl)-propane (bisphenol-A), 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-chloro-4-hydroxyphenyl)-propane and hydroxybenzophenone.

The most preferred bisphenol is 2,2-bis-(4-hydroxyphenyl)-propane (bisphenol-A).

The copolycarbonates of the invention may entail in their structure, units derived from one or more of the suitable bisphenols.

The aromatic sulfonyl diphenols (hereinafter SDP) useful in the practice of the invention are those represented by the structural formula (3)

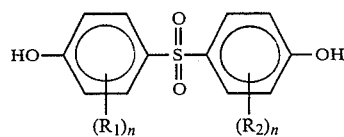

(3)

wherein n denotes 0, 1 or 2 and $R_1$ and $R_2$ independently denote H, $C_1$–$C_2$ alkyl, Cl or Br.

Preferably the 4,4'-isomer purity of the aromatic sulfonyl diphenols of the invention is at least about 99.9% by weight.

The dihydroxybiphenyls (hereinafter BPO) useful in the practice of the invention are those represented by the structural formula (4)

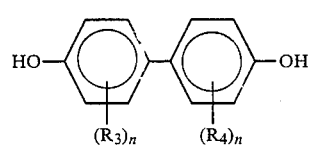

(4)

wherein $R_3$ and $R_4$ independently denote, H, $C_1$–$C_4$ alkyl or a halogen and n is 0, 1 or 2. Preferably the useful BPO is halogen-free and, most preferably, it is 4,4'-dihydroxybiphenyl.

The copolycarbonates of the invention comprise structural residues of each of the aromatic diphenols, SDP and BPO, as described above. The preferred copolycarbonates may contain 0.1 to 60 mole percent BPO, 0.1–50 mole percent SDP and 0.1–95 mole percent of the aromatic diphenols, more preferred are the copolycarbonates wherein residues of SDP are present in an amount of 0.1 to about 30 mole percent, those of BPO in an amount of 0.1 to about 30 mole percent and those of aromatic diphenols in an amount of 50 to 90 mole percent. Most preferred are copolycarbonates wherein residues of SDP and of BPO each are present in an amount of about 5.0 to about 30.0 mole percent and those of aromatic diphenols in an amount of 50 to 90 mole percent.

The aromatic copolycarbonates of the invention may be branched by the incorporation of small amounts, preferably of between about 0.05 and 2.0 mol % (relative to diphenols employed), of trifunctional or more than trifunctional compounds, especially compounds having three or more phenolic hydroxyl groups. Polycarbonates of this type are described, for example, in German Offenlegungsschriften (German Published Specifications) Nos. 1,570,533; 1,595,762; 2,116,874 and 2,113,347, British Specification 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis[4,4,-bis-(4-hydroxyphenyl)-cyclohexyl]-propane, 2,4-bis-(4-hydroxyphenylisopropyl)phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene. Some of the other trifunctional compounds are 2,4-dihydroxy-benzoic acid, trimesic acid, cyanuric chloride and 3,3-bis-(4-hydroxyphenyl)-2-oxo-2,3-dihydroindole.

In yet another preferred embodiment of the present invention, the copolycarbonate may be reinforced with glass fibers, preferably present in from about 5 to 40% by weight, most preferably in from about 10 to 30% by weight, based on the weight of the total composition. Glass fibers which can be used in the present invention are, for example, fibers of low alkali, aluminum-borosilicate glass having a maximum alkali metal oxide content of about 2.0% by weight (E-glass), of diameter between about 8–15μ and length between about 300 and 800μ (short glass fibers) or about 2000 to 12,000μ (chopped strands) as well as rovings.

The copolycarbonates of the present invention may also contain other conventional resin additives such as pigments, dyes, UV stabilizers, thermal stabilizers, mold release agents and fillers.

Any additives, including glass fibers, may be blended with the copolycarbonate resin in known mixing devices such as kneaders, single-screw extruders, twin-screw extruders, mills and the like.

The invention will be further illustrated but is not intended to be limited by the following examples.

EXAMPLES

Copolycarbonates of the invention were prepared by the interfacial polycondensation process in which the disodium salts of bisphenol-A and of 4,4'-sulfonyl diphenol and of 4,4'-dihydroxybiphenyl were reacted with phosgenation. The polymer solution thus obtained after washing free from electrolytes and catalysts were processed through a divolatizing extruder and the extrudate was pelletized and the pelletized material later used for injection molding of the specimens. The properties are reported below. In the reporting, BPA denotes disphenol-A, SDP denotes the sulfonyl diphenol described in formation (3) above where n=0, and BPO denotes the dihydroxybiphenyl of formula (4) above where n=0. The relative amounts of the monomers are noted in mole percent.

|  | 1 | 2 | 3 | 4 | 5 |
|---|---|---|---|---|---|
| BPA | 90 | 85 | 80 | 75 | 70 |
| SDP | 5 | 10 | 10 | 15 | 20 |
| BPO | 5 | 5 | 10 | 10 | 10 |
| Melt Index gm/10 min. | 4.4 | 4.5 | 1.7 | 4.0 | 3.9 |
| Impact strength ft.-lb/in., notched Izod |  |  |  |  |  |
| $\frac{1}{8}''$ | 14.1 | 12.2 | 12.6 | 11.5 | 11.4 |
| $\frac{1}{4}''$ | 14.0 | 2.9 | 12.2 | 10.1 | 10.0 |
| Critical thickness (mils) | >255 | — | >261 | >236 | >236 |
| HDT °C. at |  |  |  |  |  |
| 264 psi | 139 | 149 | 149 | 141 | 142 |
| 66 psi | — | — | — | 155 | 153 |

Glass reinforced 10% by weight compositions comprising the resin of Examples 4 and 5 above, were prepared and their properties determined as reported below (Examples 6 and 7, respectively).

|  | 6 | 7 |
|---|---|---|
| Impact strength notched Izod ft.-lb/in. |  |  |
| $\frac{1}{8}''$ | 2.03 | 1.7 |
| $\frac{1}{4}''$ | 1.5 | 0.6 |
| Critical thickness, mils | >92 | >90 |
| HDT °C. at 264 psi | 152 | 155 |
| 66 psi | 166 | 163 |

What is claimed is:

1. An aromatic copolycarbonate molding composition comprising the reaction product of solely
   (i) an aromatic diphenol conforming to the structural formulae (1) or (2)

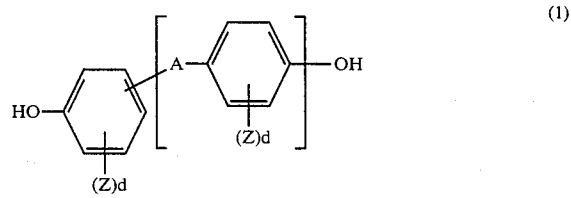

(1)

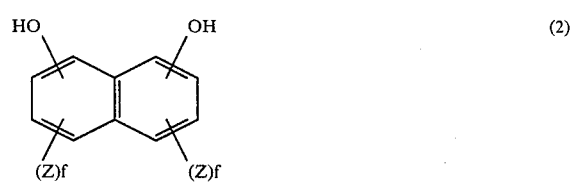

(2)

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, an —SO— or a radical of the general formula

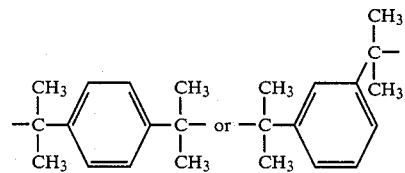

e denotes the number 0 or 1;
Z denotes a $C_1$–$C_4$ alkyl and if several Z radicals are substituents in one aryl radical, they may be identical or different;
d denotes 0 to 4;
f denotes 0 to 3;
(ii) an aromatic sulfonyl diphenol conforming to

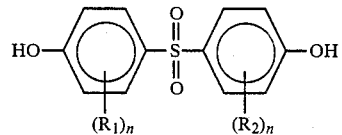

wherein
n denotes 0 to 2 and $R_1$ and $R_2$ independently denote H or a $C_1$–$C_4$ alkyl;

(iii) a dihydroxybiphenyl conforming to

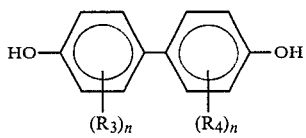

wherein $R_3$ and $R_4$ independently are H or a $C_1$–$C_4$ alkyl and n is 0 to 2;

(iv) a monophenol and (v) a carbonic acid derivative.

2. The molding composition of claim 1 wherein said reaction product consists of about 0.05 to about 2.0 mol percent, relative to the diphenols employed of trifunctional compounds or compounds having a functionality of greater than 3.

3. The composition of claim 1 wherein said dihydroxybiphenyl is represented by the structural formula

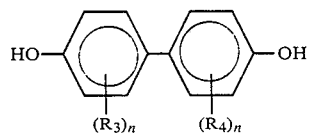

wherein $R_3$ and $R_4$ independently denote H, $C_1$–$C_4$ alkyl or a halogen atom and n is 0 to 2.

4. The composition of claim 1 wherein said reaction product comprises between about 0.1 and 60 mole percent of said dihydroxybiphenyl, between about 0.1 and 50 mole percent of said aromatic sulfonyl diphenol and between about 0.1 and 95 mole percent of said aromatic diphenols.

5. The copolycarbonate of claim 1 wherein said aromatic diphenol is bisphenol-A.

6. The copolycarbonate of claim 1 wherein said dihydroxybiphenyl is of the structural formula

* * * * *